United States Patent

[11] 3,587,070

[72] Inventor Robert M. Thomas
Waterloo, Ontario, Canada

[21] Appl. No. 883,062
[22] Filed Dec. 8, 1969
[45] Patented June 22, 1971
[73] Assignee Automatic Electric Laboratories, Inc.
Northlake, Ill.

[54] MEMORY ARRANGEMENT HAVING BOTH MAGNETIC-CORE AND SWITCHING-DEVICE STORAGE WITH A COMMON ADDRESS REGISTER
8 Claims, 6 Drawing Figs.

[52] U.S. Cl. 340/174 SP, 340/174 TB, 340/174 M, 340/172.5
[51] Int. Cl. G11c 7/00, G11c 17/00, G11c 5/02
[50] Field of Search 340/174, 172.5

[56] References Cited
UNITED STATES PATENTS 3,275,840 9/1966 Harding et al. 340/174 X
3,487,173 12/1969 Duthie et al. 179/18 ES
3,524,175 8/1970 Mosenkis 340/174

OTHER REFERENCES

IBM TECHNICAL DISCLOSURE BULLETIN, " Rapid Turnoff for Transistor Driven Circuits" Fugere et al., Vol. 9, No. 6, 11/66, pp. 670— 671, copy in 340-174 TB

*Primary Examiner*—Stanley M. Urynowicz, Jr.
*Attorneys*—Cyril A. Krenzer, K. Mullerheim and B. E. Franz

ABSTRACT: A read-only ring core memory and a flip-flop or relay temporary memory use a common address register, with two decoded address digits actuating memory drivers and two actuating memory switches. Word wires of the ring core memory are each connected from a driver and isolating diode, selectively through some cores and round others to store a word, and then to a switch. The temporary memory read circuit uses a transformer with the primary winding connected between a driver and a switch, like the connection of a word wire. Sense windings of the ring cores and gates from the temporary memory outputs are coupled to common read output amplifiers.

FIG. 1

INVENTOR
ROBERT M. THOMAS
BY Bernard E. Franz
ATTORNEY

MEMORY ARRANGEMENT HAVING BOTH MAGNETIC-CORE AND SWITCHING-DEVICE STORAGE WITH A COMMON ADDRESS REGISTER

CROSS-REFERENCE TO RELATED APPLICATION

This invention is related to the communication switching system disclosed in the U.S. Pat. application SN 565,544 filed July 15, 1966, now patent No. 3,487,173 by R. W. Duthie and myself.

BACKGROUND OF THE INVENTION

1. Field of the Invention

This invention relates to a memory arrangement using both magnetic-core storage in one section and switching-device storage such as flip-flops or relays in another section, and more particularly to a read arrangement having inputs from a common address register and outputs to one or more common registers such as accumulators and instruction registers.

2. Description of the Prior Art

The above-mentioned Duthie et al. patent discloses a system using a read-only memory having a relatively large magnetic cores of linear ferrite material, with word wires selectively threaded through some cores to store a bit "1" and round other cores to store a bit "0" (bit=binary digit). Each word wire is connected via a diode to a memory driver at one end and to a memory switch at the other end. The memory addresses comprise four hexadecimal digits, two of which enable the drivers and the other two of which enable the switches. Each core has a sense winding connected to a read amplifier. Temporary memory storage is accomplished by using flip-flops and relays, with outputs thereof connected via special pulse gates to the memory output register. A separate gated pulse amplifier is used for each of the temporary memory words, which is enabled by the coincidence of the four address digits and a clock pulse, and the output of this gated pulse amplifier enables the gates from the outputs of that temporary memory word.

The object of this invention is to simplify the temporary memory read arrangement, and to make it more compatible with the read-only memory read arrangement.

SUMMARY OF THE INVENTION

According to the invention, in the combination comprising a first memory section having magnetic-core storage, and a second memory section having storage in switching devices such as flip-flops, relays or the equivalent, with a common address register supplying some decoded digits to memory drivers and other decoded digits to memory switches; an improved read arrangement for the second section comprises a transformer having the primary winding with one end connected through a diode to a driver and the other end connected to a switch, in the same manner as the word wires of the first section are connected to drivers and switches. The secondary of the transformer for each word is coupled via an amplifier to enable the gates from the outputs of the storage devices. In the preferred embodiment these gates comprise simply two diodes connected back to back between the output of the switching device and the input of a read amplifier, with the junction point between the diodes connected via a resistor to the output of the amplifier which is connected to the secondary of the transformer for that word.

DETAILED DESCRIPTION

Figure 1:
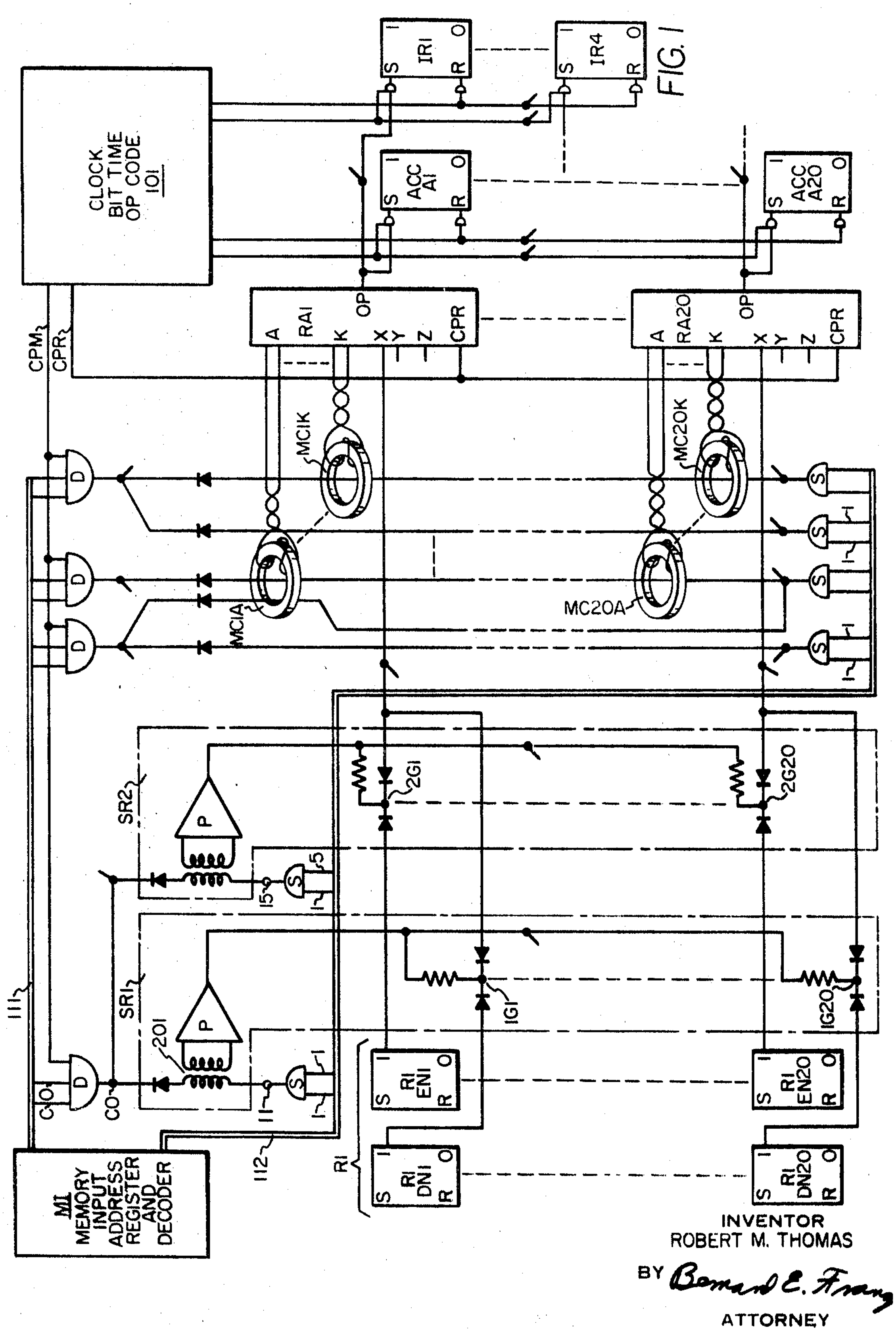
FIG. 1 is a functional block and schematic diagram showing the memory arrangement for a system, with a section using magnetic-core storage, and a section using flip-flop storage, along with the read arrangement for the two sections.

FIG. 1 shows a memory arrangement generally similar to that shown in said Duthie et al. patent application. A first section, the semipermanent or read-only memory is of the ring core-type which uses cores of a linear ferrite material, with each word comprising a wire threaded through each core in which a bit "1" is to be stored and round a core for each bit "0." Each word wire is connected via a diode to a driver D at one end and to a switch S at the other end. The addressing of the word wires is controlled by a memory input address register MI; each address comprises 16 bits, divided into four digits of 4 bits each. These digits are decoded in a decoder of the address register MI with two used via conductor group 111 as inputs to each driver D, and two used via conductor group 112 as inputs to each switch S. There is also a clock pulse input via a lead CPM to each of the drivers. To expedite the threading and removal of word wires, the read-only memory has been divided into several modules, of which two are shown in FIG. 1. One module comprises 20 cores MC1A—MC20A, and the other comprises 20 cores MC1K—MC20K. The cores have individual sense windings connected respectively to the inputs of 20 read amplifiers, RA1—RA20. Each read amplifier has 10 inputs A—K for inputs from the read-only memory, with the sense windings of the cores MC1A and MC1K for example being connected to the inputs A and K of amplifier RA1, and the corresponding cores of each of the other bit positions having their sense windings connected to corresponding inputs of the corresponding read amplifiers.

As disclosed in said Duthie et al. patent, a second section, the temporary memory comprises flip-flops and relays which may also have other functions in the system. For example, each of the dialing registers have one word of temporary memory store for the dialed number and another word for the equipment number of the calling line. In an electromechanical version these are relay stores, while in an electronic version they are flip-flops. In FIG. 1 two words of the temporary memory are shown. One word comprises 20 flip-flops R1DN1—R1DN20, and the other word comprises 20 flip-flops R1EN1—R1EN20.

Individual storage readout circuits are used to read the temporary memory words. For example the storage readout circuit SR1 is used to read the temporary memory word R1DN and circuit SR2 is used to read the word R1EN. Each of the storage readout circuits comprises a priming circuit P, driving 20 gating points. Each gating point is connected to the cathode of two diodes and via a resistor to the output of the priming circuit. The anode of one diode is connected to the output of the temporary memory flip-flop or relay contact, and the anode of the other diode is connected to an input of a read amplifier. Each of the read amplifiers has three temporary memory inputs designated X, Y, and Z, each of which is connected in multiple to the diodes of several gating points for the corresponding bit position. For example, the "1" outputs of the flip-flops R1DN1—R1DN20 are connected via the gating points 1G1—1G20 of the storage readout circuit SR1 to the X inputs of the read amplifiers RA1—RA20, and similarly the outputs of the word R1EN are coupled via the gating points of 2G1—2G20 of storage readout circuit SR2 to the same X inputs.

The input of each priming circuit of each storage readout circuit comprises a transformer having a primary winding with one end connected via a diode to a memory driver D and the other end of the winding connected to the output of a memory switch S. The transformer and priming circuit form a gate enabling arrangement. The word R1DN, for example, may have the address COLL, so the primary winding in the storage readout circuit SR1 has one end connected to a driver having inputs C and O and to a switch having inputs 1 and 1; and the word R1EN may have the address CO15 so that its primary winding is connected to the same driver and the secondary winding is connected to the switch having inputs 1 and 5.

There is no separate memory output register, but the outputs of the read amplifiers are coupled directly to the accumulator and instruction register stores of the central processor. FIG. 1 shows an accumulator store comprising flip-flops A1—A20 and an instruction register comprising flip-flops IR1—IR4. Each of the read amplifiers has an output OP. The outputs of the 20 amplifiers RA1—RA20 are connected to the AC set inputs of flip-flops A1—A20 to the AC set inputs of the flip-flops IR1—IR20, and also to the AC set input of flip-flops B1—B20 of a second accumulator not shown in FIG. 1. The DC set inputs of the accumulator and instruction register flip-flops are connected to block 101 and actuated in accordance with the bit time and OP codes; to store each word read from memory into one or more of the accumulator and instruction register stores.

STORAGE READOUT CIRCUIT

Figure 2:
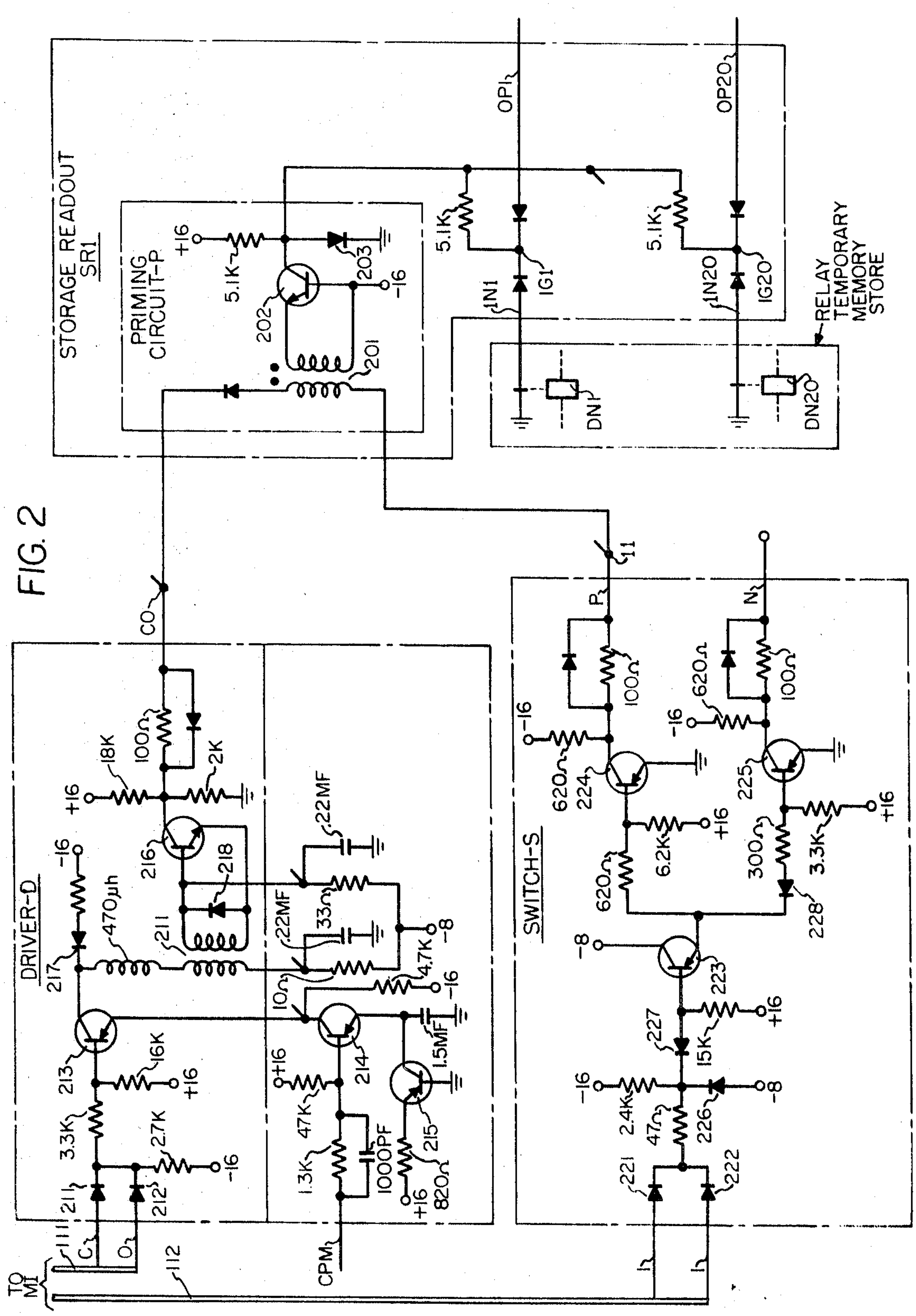
FIG. 2 is a schematic diagram of a memory driver, a memory switch, and a storage read out circuit along with one word of temporary memory storage.

Schematic diagrams of the storage readout circuit SR1, along with the driver and the switch, are shown in FIG. 2. The temporary memory word is represented in FIG. 2 by 20 relays, DN1—DN20. When storing a bit "0" each relay is in the unoperated condition with the output conductor connected via break contacts to ground, and to store a bit "1" the relay is operated to open the contacts thereby placing an open circuit condition on the output lead. With a flip-flop store as shown in FIG. 1, the output lead is connected to the collector of a transistor which is also at open circuit potential when a bit "1" is stored, and is connected to ground potential at the emitter electrode by the operated transistor when a bit "0" is stored.

The storage readout circuit is designed to gate the outputs of 20 flip-flops or relay contacts of a word to the X, Y, or Z inputs of read amplifiers. Normally all of the outputs OP1—OP20 of the readout circuit appear as open circuits (reverse-biased output diodes). When the driver and switch to which the circuit is connected are activated, the logic condition present at each of the inputs IN1—IN20 appears on the corresponding output. Note that in this system a logic condition "1" is an open circuit or negative 8 volts potential, while a logic "0" is a ground potential. Each output can drive one or two read amplifier inputs, which permits the online central processor to check temporary memory registers in the off-line central processor.

In order to obtain sufficient driving current two drivers in parallel are used for storage readout circuits, but only one is shown in FIGS. 1 and 2. Ordinarily, this is no great inconvenience since temporary-memory addresses are normally grouped into one hundreds group.

The operation of the storage readout circuit begins when the address CO11 associated with this driver-switch combination is received from the memory input address register MI, producing a current pulse through the primary of the transformer 201. A similar pulse is induced in the secondary winding, which drives the transistor 202 into conduction. This causes a negative 16 volt potential to be applied through the transistor to the gate points 1G1—1G20, causing them to assume voltages near to that on the leads IN1—IN20 respectively. The input logic conditions at the leads IN1—IN20 are thereupon transferred to the corresponding output leads OP1—OP20.

Normally when the corresponding word is not being read, diode 203 clamps the voltage from the positive 16 volt supply through the 5.1K resistor at one diode drop above the ground potential. The diodes at the inputs of the gate points will then be reverse biased regardless of the input conditions and no information can be transferred to the outputs.

CLOCK PULSES

Figure 4:
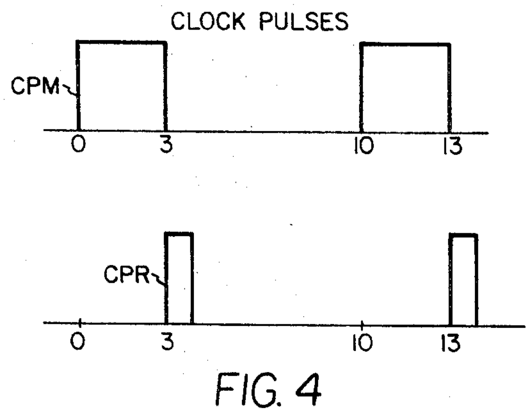
FIG. 4 is a graph showing the clock pulses for the system.

The clock pulses as now used in the system are shown by graphs in FIG. 4. The pulses recur every 10 microseconds. The pulses on lead CPM have a duration of 3 microseconds. The pulses on lead CPR begin at the end of each CPM pulse, and have a duration of 1 microsecond. The pulses on lead CPM are used to gate the memory driver selected by the address in the memory input address register MI. The pulses on lead CPR are used to strobe the read amplifiers. A "1" output from a memory core or storage readout circuit coincident with a CPR pulse produces a pulse from the read amplifier output. The pulses on lead CPR also are used for all logic operations requiring clocking, such as the bit time counter, incrementing of the address register, and counting and shifting in various registers. All data entry into temporary memory stores is made coincidentally with a CPR pulse. This avoids the possibility of the processor reading a word from temporary storage during the transition period of a flip-flop, which would result in the word content being read incorrectly.

MEMORY DRIVER CIRCUIT

The schematic circuit diagram for a memory driver D is shown in FIG. 2. This circuit is designed to produce an output pulse capable of driving a memory wire, during the occurrence of a 3-microsecond pulse on lead CPM. To produce a proper output pulse, the driver circuit input logic via diodes 211 and 212 must both be at the logic level "1" for a duration of 1 microsecond before the CPM pulse starts, and must remain satisfied during the CPM pulse. Similarly, to prevent an output pulse from occurring the logic condition of at least one of the diodes 211 and 212, which form an AND gate, must be "0" for 1 microsecond before the CPM pulse starts, and must remain satisfied during the CPM pulse.

The output of the driver is sufficient to drive one word wire in the ring core memory, and two are required in parallel to drive a storage readout circuit, although only one is shown in FIG. 2.

OPERATION.

Transistor 215 is normally conducting, supplying ground potential to the emitter electrode of transistor 214. If the positive 16 volt supply is lost or if the clock pulse locks on negative 8 volts, transistor 215 will become nonconducting or limit the ground current to transistor 214, protecting transistors 213 and 214 against excessive current.

If true conditions exist at the inputs, that is signals C and O at diodes 211 and 212 respectively are both floating or at a level more negative than minus 8 volts, the base electrode of transistor 213 because of the bias conditions via the resistors, will be driven approximately 4 volts negative. If one or both of the inputs via the diodes 211 and 212 is a logic "0," or a ground potential, the small positive voltage at the base electrode of transistor 213 prevents the transistor from conducting.

If a clock pulse on lead CPM is present, the base-emitter junction of transistor 214 becomes forward biased placing a ground from transistor 215 at the emitter electrode of transistor 213.

Assuming all of the input conditions are true on leads C, O and CPM, the transistor 213 conducts bringing the junction of diode 217 and the inductor at the collector electrode of transistor 213 from a minus 8 volt potential to ground. This causes a ramp current to flow in the primary winding of the transformer, inducing a similar current in the secondary winding. Transistor 216 becomes conducting resulting in an output directly proportional to that induced in the transformer. Diode 218 is required to drain off the current due to the back EMF induced in the inductor when the current drops to zero. The 18K and 2K resistors at the collector electrode of transistor 216 hold the current of the collector slightly positive between output pulses and hold all the diodes in the succeeding memory diode circuits reverse biased. The parallel configuration of a resistor and diode between the collector electrode of transistor 216 and the output is required to dampen ringing on the word wire.

Figure 5:
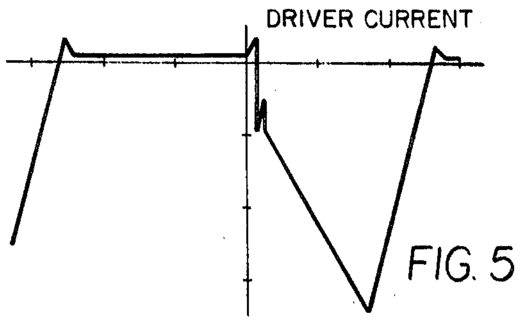
FIG. 5 is a graph showing the driver current.

The output waveform is shown by a graph in FIG. 5 in which each division on the horizontal axis represents 2 microseconds.

MEMORY SWITCH CIRCUIT

The memory switch circuit is shown by a schematic diagram in FIG. 2. This circuit provides a near ground output for memory word wire selection whenever the input condition via diodes 221 and 222 forming an AND gate is true. Under all other conditions, the output go to minus 16 volts. Separate outputs are provided so that status wires may be connected to the N output and program wires to the P output in the system. The P output is also used for storage readout circuits. A diode prevents foreign voltages on the N output from affecting operation of the P output. As a result, the application of foregoing voltages or grounds to the network does not affect the program memory. The enabling time is 0.5 microseconds maximum and the disabling time is 2.0 microseconds maximum. The N output will drive three word wires and the P output may drive one word wire or one storage readout circuit.

OPERATION.

The diodes 221 and 222 along with the 2.4K resistor to minus 16 volts form a two-input diode AND gate. The diode 226 clamps the voltage at the cathode of diode 227 to minus 8 volts to prevent saturation of transistor 223. A 47 ohm series resistor limits dissipation in the preceding gates if diode 226 shorts. Diode 227 provides voltage drop to prevent saturation of emitter follower 223, while a 15K resistor to plus 16 volts pulls the base of transistor 223 to a positive voltage if the input logic condition is not true. If the input logic is satisfied by both inputs being true, the emitter electrode of transmitter 223 becomes nearly minus 8 volts; otherwise it is approximately ground potential.

Transistor 224 and the associated components form an inverting amplifier. The value of the bias resistors is such that when the input logic is true, causing the emitter electrode of transistor 223 to become almost minus 8 volts, transistor 224 is saturated. Otherwise, transistor 224 is cut off by positive bias through a 6.2K resistor. A 620 ohm resistor at the collector of transistor 224 keeps the output at minus 16 volts when transistor 224 is cut off, keeping memory word diodes reverse biased to thereby prevent stray currents. The parallel combination of a diode and resistor between the collector electrode of transistor 224 and the P output form a damping network to eliminate transients.

The transistor 225 and associated components form another inverting amplifier for the N output similar to that described above for the transistor 224. Diode 228 performs no circuit functions under normal conditions. However, if a negative foreign potential appears on the N output due to a wire clipping or other fault in the network, this diode insures normal functioning of transistors 223 and 224 and associated circuits.

Figure 6:
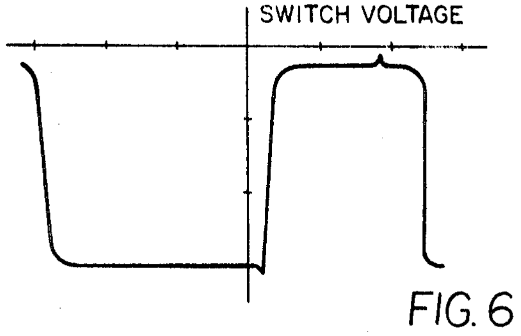
FIG. 6 is a graph showing the switch voltage.

The output waveform is shown in FIG. 6, wherein each of the horizontal divisions represent 2 microseconds.

READ AMPLIFIER CIRCUIT

Figure 3:
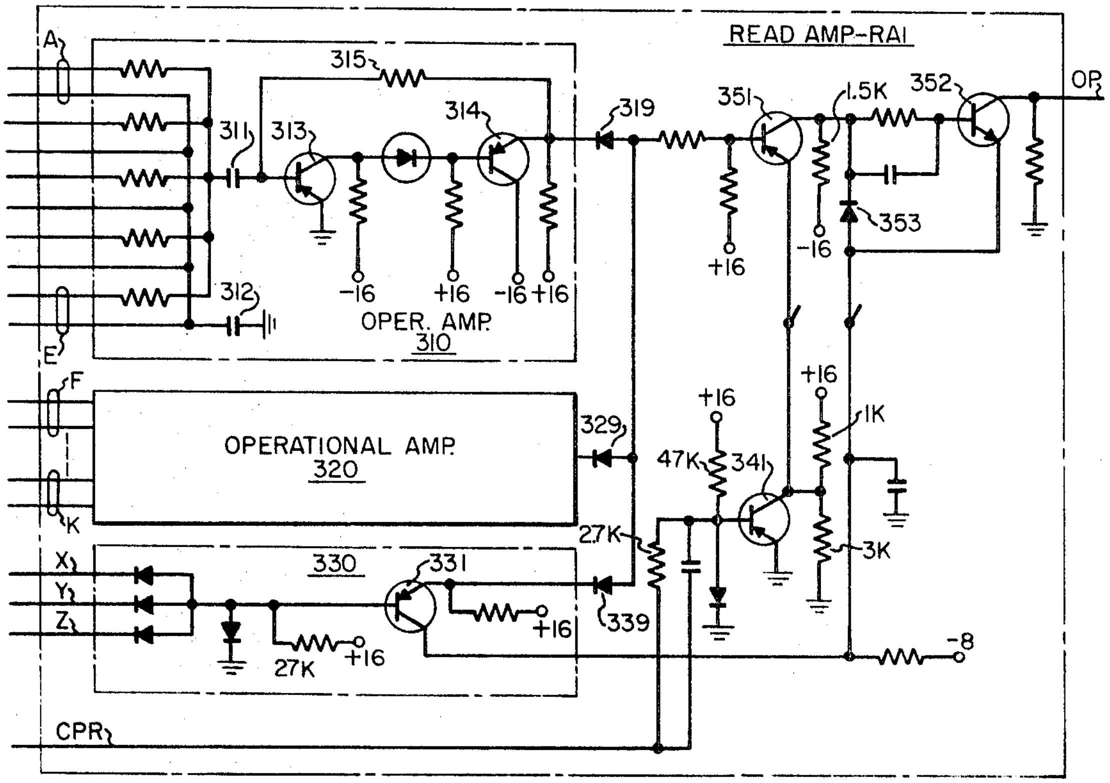
FIG. 3 is a schematic diagram of a read amplifier.

The read amplifier circuit is shown by a schematic diagram in FIG. 3. This circuit senses the output of the memory core winding and storage readout circuits, and passes the clock pulse if a "1" condition is present on any of its inputs. Since the passing of the clock pulse depends on the presence of a "1" when the pulse appears, a strobing function is performed.

Inputs A—K are each arranged to sense the output of a memory core (plus 1 volt). A decision level of about one-half volt is used to insure noise immunity. Each of these inputs is connected to a memory core sense winding via a twisted pair. The return lead of these twisted pairs are all connected together.

The X, Y and Z inputs accept signals from the storage readout circuits.

A clock pulse on lead CPR is supplied to provide strobing. Up to four read amplifier outputs may be connected in parallel.

OPERATION.

This circuit includes two identical operational amplifiers 310 and 320 used to amplify and combine memory core output signals, an emitter follower amplifier 330 to amplify the output from storage readout circuits, an OR gate comprising diodes 319, 329 and 339, and a strobing circuit and output amplifier. The five inputs A—E from memory core sensing windings via twisted pairs each have one lead connected through respective resistors to a coupling capacitor 311 and return leads connected together through an equal capacitor 312 to ground. The five inputs F—K of amplifier 320 are similarly connected. When a pulse is sent down a word wire of the memory, a similar pulse is generated in the sense winding of each memory core storing a bit "1." The sense signal is a positive going 1 volt peak exponentially rising pulse. The pulse passes through the coupling capacitor 311 and is amplified and inverted by transistors 313 and 314. The resulting output at the emitter of transistor 314 is a negative going 4 volt peak pulse. Due to the degenerative effect through resistor 315, the base electrode of transistor 313 is held very close to ground and the gain of the amplifier is closely controlled.

When no clock pulse is present on lead CPR, the plus 16 volt supply through a 47K resistor reverse biases the base-emitter junction of transistor 341. This allows the emitter of transistor 351 to go negative due to the minus 16 volt supply through a 1K resistor to the collector electrode of transistor 341. Under these conditions, transistor 351 cannot conduct and no output pulse results. If a pulse appears on lead CPR, transistor 341 conducts placing a ground on the emitter electrode of transistor 351. If an input pulse exists at one of the DC inputs A—K, the base electrode of transistor 351 is at a negative potential and the transistor will become conducting, passing an inverted clock pulse. This pulse is reinverted by transistor 352. Diode 353 clamps the collector voltage of transistor 351 to minus 8 volts when that transistor is off. A capacitor in parallel with a resistor coupling the collector electrode of transistor 351 to the emitter electrode of 352 speeds up the switching transistor 351.

Transistor 331 is an emitter follower which is used to amplify the input signal from storage readout circuit. When a negative voltage from a storage readout circuit via one of the inputs X, Y or Z and an input diode is present, the base of transistor 331 goes negative, causing the emitter electrode to go negative. This causes an output pulse to be produced in the same manner as from the operational amplifiers.

ALTERNATIVE EMBODIMENT

While the read-only memory has been described as comprising linear magnetic ring cores with selectively threaded word wires; it could also be of the type comprising square hysteresis loop magnetic cores having a row of cores for each wore, with read and write wires connected between drivers and switches through all cores of the word, and sense windings threaded through cores in the same bit position of the several words.

CONCLUSIONS

There has been described a memory arrangement in which a storage readout circuit provides an economical arrangement for temporary memory reading; provides the means for driving the read amplifiers from the temporary memory readout, and provides a circuit which may be operated from the memory drivers and switches. The memory arrangement now provides for reading from a temporary memory store in the same manner as reading from a word wire in the ring core section of the memory, namely a memory driver and a memory switch are used. The word contents appear at the read amplifier outputs and are clocked into the appropriate store with a CPR pulse.

The storage readout circuit retains the characteristic disclosed in said Duthie et al. arrangement that any or all of the temporary memory signal bits can be grounded to force logic "0" or left open to force logic "1" in the word. This feature is used, for example, to "busy-out" dialing registers, where a busy key is used to ground the leads to the storage readout circuit from bits 1—4 of the dialed number (DN) store. This part of the store contains the register instructions and call-for-service bits, which are read out as 0000 until the busy key is released. Bits of other temporary memory words may be either permanently left open or permanently grounded as required for portions of a word which never change.

What I claim is:

1. A memory arrangement organized with a plurality of words and a given number of bit positions per word, comprising:

- a first memory section having a plurality of magnetic cores each having a given one of said bit positions, a plurality of memory drivers, a plurality of memory switches, a plurality of word wires each connected from a memory driver through some of said cores to a memory switch, a plurality of sense windings each individual to one of said bit positions and coupled to at least one of the cores thereof;
- a second memory section having a plurality of sets of bistable devices, each having an individual output with one of two potential conditions selectively thereon according to the state of the device, each set storing one word and each device of a set being for 1 bit position, individual gates connected to said outputs;
- memory address means using a numbering system having a first and a second part for each address with first and second groups of address conductors for the two parts respectively, the memory drivers being connected to conductors of the first group and the memory switches being connected to conductors of the second group; each said set of the second memory section having gate enabling means coupled to conductors of the first and second groups of address conductors and to the gates of the set;
- memory output means coupling said sense windings and said gates to inputs for respective bit positions of at least one output register;
- the arrangement being operative responsive to selection of an address of the first section to actuate from the address means at least one driver via conductors of the first group and at least one switch via conductors of the second group to produce current flow through the word wire connected to that driver and switch, which selectively induces potentials in sense windings of cores threaded by the word wire in accordance with the information stored in that word, and the memory output means responding to the sense winding potentials to store the information in at least one output register;
- and alternatively the arrangement being operative responsive to selection of an address of the second section to actuate from the address means the gate enabling means for that word via conductors of the first and second groups, which enables the gates of that set to cause the memory output means to respond to the potentials at the device outputs to store the information in at least one output register;
- the improvement wherein said gate enabling means for each set of the second memory section comprises a transformer having a primary and a secondary winding, and coupling means between the secondary winding and the gates of that set, with the primary winding connected between one of said memory drivers and one of said memory switches whereby current flows therein responsive to selection of the corresponding address similar to the current flow in a word wire of the first section, the current flow in the primary winding including a potential in the secondary winding to actuate said coupling means, which enables the gates.

2. A memory arrangement according to claim 1, wherein each of said gates connected to the outputs of said bistable devices of the second memory section comprises two diodes connected in series back-to-back between the output of the bistable device and said memory output means, with the junction point between the two diodes connected via an individual resistor to a common point at the output of said coupling means for each word of the second section.

3. A memory arrangement according to claim 2, wherein said coupling means comprises a transistor having emitter, base and collector electrodes, said secondary winding is connected between the emitter and base electrodes and to a source of bias potential, the collector electrode is connected to a source of bias potential and to said common point of the resistors of the individual gates for that set of bistable devices, said collector bias potential normally biasing the gates via said individual resistors to block coupling between the bistable devices and the memory output means, and responsive to a potential induced in the secondary winding the potential at the collector enables the gates via the individual resistors so that the potential at each bistable device output is coupled to the memory output means.

4. A memory arrangement according to claim 2 wherein said memory output means comprises a read amplifier arrangement with at least one read amplifier for each bit position, each read amplifier having inputs for connection to sense windings and other inputs for connection to said individual gate, and a common output for connection to at least one output register.

5. A memory arrangement according to claim 4, wherein said magnetic cores of the first memory section are of a linear magnetic material, and each word wire is selectively threaded through some cores and round others to thereby store a particular word of information, there being a plurality of said word wires threaded through the same cores.

6. A memory arrangement according to claim 5, wherein said first memory section comprises a plurality of modules, each module having one core per bit position, with each module having a plurality of said word wires threaded selectively through it, each said core having an individual sense winding connected to an individual input of a read amplifier for that bit position.

7. A memory arrangement according to claim 6, wherein the output sides of said individual gates from each bit position of a plurality of said bistable devices are connected in common to an input of said read amplifier for that bit position.

8. A memory arrangement as claimed in claim 7, wherein said coupling means comprises an amplifier having an input coupled to said secondary winding and an output connected in common to said individual resistors to the individual gates of that set of devices.